United States Patent [19]

Uekado et al.

[11] Patent Number: 5,109,032
[45] Date of Patent: Apr. 28, 1992

[54] FOAMED HEAT INSULATION MATERIAL

[75] Inventors: Kazutaka Uekado, Nishinomiya; Hideo Nakamoto, Yao, both of Japan

[73] Assignee: Matsushita Refrigeration Co., Osaka, Japan

[21] Appl. No.: 602,248

[22] PCT Filed: Mar. 20, 1990

[86] PCT No.: PCT/JP90/00376
§ 371 Date: Nov. 7, 1990
§ 102(e) Date: Nov. 7, 1990

[87] PCT Pub. No.: WO90/11320
PCT Pub. Date: Apr. 10, 1990

[30] Foreign Application Priority Data

Mar. 22, 1989 [JP] Japan ................. 1-069742
Jun. 28, 1989 [JP] Japan ................. 1-165979
Jul. 12, 1989 [JP] Japan ................. 1-181072
Jul. 28, 1989 [JP] Japan ................. 1-197755

[51] Int. Cl.⁵ ............................. C08J 9/00
[52] U.S. Cl. ................... 521/110; 521/111; 521/122
[58] Field of Search ........... 521/110, 111, 122

[56] References Cited

U.S. PATENT DOCUMENTS 4,551,481 11/1985 Smith et al. ............... 521/110
4,569,861 11/1986 Smith et al. ............... 521/110
4,594,362 6/1986 Smith et al. ............... 521/76

FOREIGN PATENT DOCUMENTS 52-98020 8/1977 Japan .
57-49628 3/1982 Japan .
58-37338 8/1983 Japan .
62-7747 1/1987 Japan .

Primary Examiner—Morton Foelak
Attorney, Agent, or Firm—Stevens, Davis, Miller & Mosher

[57] ABSTRACT

This invention relates to a foamed heat insulation material for refrigerators and freezers which makes it possible to reduce the quantity of a fluorocarbon foaming agent used therein. Said foamed heat insulation material is obtained by mixing a carbon dioxide adsorbent prepared by treating the surface of the carbon dioxide adsorbent so as to make it hydrophobic with a water-containing premix component and an isocyanate component and stirring the resulting mixture.

The foamed heat insulation material thus obtained can reduce the quantity of the fluorocarbon foaming agent at the time of foaming owing to the use of water as a foaming agent, and after the foaming, can adsorb off with the carbon dioxide adsorbent the carbon dioxide generated by the isocyanate-water reaction and thereby purify the gas in foams into a fluorocarbon gas.

3 Claims, No Drawings

FOAMED HEAT INSULATION MATERIAL

TECHNICAL FIELD

This invention relates to a foamed heat insulation material used in refrigerators, freezers, and the like.

BACKGROUND ART

In recent years, there is a requirement to improve the heat insulating properties of foamed heat insulation materials by reducing their thermal conductivity from the standpoint of energy-saving. At the same time, it is a very important theme to reduce the quantity of fluorocarbons used as a foaming agent and thereby to contribute to the improvement of environmental problems caused by fluorocarbons such as the destruction of the ozone layer, the rise in atmospheric temperature on the earth, etc.

For this reason, in the production of rigid urethane foams as typical foamed heat insulation material, various improvements are being attempted with regard to main starting materials such as polyol and organic polyisocyanate, as well as assistant raw materials such as foam stabilizer, catalyst and foaming agent. In order to reduce the thermal conductivity of rigid urethane foams, it is fundamentally important to improve the gas thermal conductivity of a gas component in foams, and it has been considered to be particularly an effective measure to use trichlorofluoromethane (hereinafter referred to as R-11) as a foaming agent and to fill the bubbles of foams with R-11 gas. However, on the other hand, in order to reduce the quantity of used fluorocarbons from the viewpoint of environmental pollution problems caused by fluorocarbons, etc., it is also possible to replace the foaming agent partially with carbon dioxide generated by reaction of a organic polyisocyanate and water. In such a construction, however, the carbon dioxide remains in the foams of the foamed heat insulation material and thereby the heat insulating performance of the foamed heat insulation material is deteriorated.

As an attempt to solve this problem, for example, a method of removing impurity gas components by the use of an adsorbent was proposed in Japanese Patent Application Kokai (Laid-Open) No. 57-49628. That is, the characteristic feature of this method consisted in previously mixing an adsorbent composed of a zeolite and the like into raw materials, removing the carbon dioxide generated at the time of foaming by adsorption onto the adsorbent, and as its result filling the foams with a fluorocargon gas and thereby improving heat insulating properties.

Now, a mechanism of the purification process of a fluorocargon gas in foams proposed by the above Japanese Patent Application Kokai (Laid-Open) No. 57-49628 is considered as follows. Thus, the adsorbent composed of a zeolite and the like selectively and preferentially adsorbs water before it adsorbs carbon dioxide, and hence water is immediately adsorbed by the adsorbent at the time of mixing the starting materials and the formation of carbon dioxide itself is prevented, in the reaction of water with a isocyanate by which the carbon dioxide gas is generated mainly. That is, even if an organic polyisocyanate to which a zeolite has previously been added is instantaneously mixed with a water-containing polyol component with an intention of foaming, the water has been already adsorbed by the zeolite in the time of the start of the foaming, so that the foaming takes place in the same manner as in the foaming process of a fluorocarbon alone. Further, although a carbodiimide reaction takes place to generate a slight quantity of carbon dioxide in the process of polymerization during the foaming, such a gas is readily adsorbed and as a result, the gas in the foams is purified and an excellent heat insulating performance is achieved.

According to Japanese Patent Application Kokai (Laid-Open) No. 57-49628, the main cause of $CO_2$ formation is eliminated by dehydration and the slight quantity of $CO_2$ formed by a carbodiimide reaction is also removed, whereby the gas in foams can be purified into a flon gas and heat insulating performance can be improved. However, from the standpoint of utilizing the carbon dioxide as a foaming gas, there is a problem that the quantity of the carbon dioxide formed was limited to that caused by a carbodiimide reaction and was so small in quantity that the quantity of a fluorocargon gas used could not saved greatly. In other words, the method of Japanese Patent Application Kokai (Laid-Open) No. 57-49628 was unable to simultaneously satisfy the two requirements of using carbon dioxide as a foaming gas and purifying the gas in foams into a fluorocargon gas, or the two problems of reducing the consumption of fluorocarbons for the purpose of solving the fluorocarbon problem and realizing a high heat insulation. Thus, it is an important problem to develop a technique therefor.

DISCLOSURE OF THE INVENTION

Thus, an object of this invention is to achieve both the reduction in consumption of fluorocarbons and the improvement of thermal conductivity by subjecting a carbon dioxide adsorbent to a hydrophobic treatment and using it at the time of forming a foamed heat insulation material.

The above-mentioned object of this invention can be achieved by the following construction. Thus, a carbon dioxide adsorbent such as a zeolite or the like is subjected to a surface treatment so as to make it hydrophobic. By using this carbon dioxide adsorbent, the carbon dioxide formed by reaction of an organic polyisocyanate and water becomes usable as a foaming material at the time of foaming, and thereby the quantity of the used fluorocarbon foaming agent can be reduced. Further, after foaming, the carbon dioxide is adsorbed off, and hence the gas in foams can be purified into a fluorocarbon gas.

BEST MODE FOR PRACTICE OF THE INVENTION

Next, embodiments of this invention will be described below.

Table 1 illustrates a starting material formulation in one example of this invention.

Polyether A is an aromatic amine type polyether having a hydroxyl number of 460 mg KOH/g; foam stabilizer A is F-335 manufactured by Shin-Etsu Kagaku K.K.; catalyst A is Kaolizer No. 1 manufactured by Kao K.K.; and foaming agent is constitued of pure water and trichlorofluoromethane. Necessary quantities (parts) of the starting materials are mixed together to form a premix component.

On the other hand, an isocyanate component is constituted of an organic polyisocyanate A which is crude MDI having an amine equivalent of 135, and a hydrophobic zeolite. As the hydrophobic zeolite, a tentative product prepared by adding 3 parts by weight of a silane compound (KBM-3103C, manufactured by Shin-Etsu Kagaku K.K.) to 100 parts by weight of Synthetic Zeolite 5A (powder type) manufactured by Toso K.K. and stirring and homogenizing the mixture to make the surface of said zeolite oleophilic was used.

This zeolite was used as a carbon dioxide adsorbent.

TABLE 1

| | | Example | Comparative Example A | Comparative Example B |
|---|---|---|---|---|
| Formulation of starting materials (parts by weight) | Polyether A | 100 | 100 | 100 |
| | Foam stabilizer A | 1.5 | 1.5 | 1.5 |
| | Catalyst A | 2.5 | 2.5 | 2.5 |
| | Water | 1.8 | 1.8 | 1.8 |
| | Fluorocarbon foaming agent | 25 | 25 | 25 |
| | Hydrophobic zeolite | 25 | 0 | 0 |
| | Zeolite | 0 | 0 | 25 |
| | Organic polyisocyanate | 135 | 135 | 135 |
| Reactivity (second) | Creaming time | 3 | 3 | 6 |
| | Gelling time | 35 | 34 | 38 |
| Properties of foam | Density (kg/m$^3$) | 27 | 27 | 36 |
| | Thermal conductivity ($\frac{Kcal}{mh \cdot °C}$) | 0.0128 | 0.0140 | 0.0125 |
| | Gas composition (%) $CO_2$ | 5 | 35 | 4 |
| | R-11 | 95 | 65 | 96 |

Predetermined quantities (parts) of the premix component and isocyanate component thus prepared were blended to prepare a foamed heat insulation material. Table 1 illustrates reactivity, density and thermal conductivity of the heat insulation material, and composition of the foaming gas.

Also, as comparative examples, a case in which no hydrophobic zeolite was added and a case in which a conventional zeolite (Synthetic Zeolite 5A, powder type, manufactured by Toso K.K.) was added are shown in Table 1 similarly (Comparative Examples A and B).

As the above, it has been revealed that the foamed heat insulation material of this invention scarcely contains carbon dioxide in its foams and the foams are filled with fluorocarbon gas, so that it exhibits an excellent heat insulating performance and can reduce the quantity of the fluorocarbon gas used. This indicates that, since the hydrophobic zeolite is inert to the water-absorbing reaction, it does not disturb the reaction between organic polyisocyanate and water and the generated carbon dioxide is utilized as a foaming gas and thereafter the carbon dioxide contained in foams is adsorbed by the zeolite. Although the molecular state of the hydrophobic zeolite is unknown, the hydrophilic surface of the zeolite is transformed to an oleophilic surface inert to the water in starting materials owing to combination of silyl group to the hydroxyl groups present on the surface, as the result of which the zeolite keeps inert to water at least during the period of time required for the reaction between water and an organic polyisocyanate and, at the same time, regarding the adsorption of carbon dioxide, the zeolite exhibits a practically satisfactory performance even though adsorption rate is low.

Thus, the carbon dioxide generated by the reaction between water and an isocyanate can effectively be utilized as a foaming gas, and the density of the foamed material can be reduced to the predetermined value even if the quantity of the used fluorocarbon is small. Further, since the carbon dioxide in foams is adsorbed by the hydrophobic zeolite with the lapse of time, the carbon dioxide is finally eliminated and the gas in foams is purified into a fluorocarbon gas. As a result, the thermal conductivity of the gas is improved, and the thermal conductivity of foamed heat insulation material also becomes satisfactory. That is, converting fluorocarbon so that the densities in the comparative examples become the same as that in the example, about 38 to 40 parts is necessary. Taking 25 parts in the example into account, it is understandable that reduction by 35 to 40% was achieved. As the above, the foamed heat insulation material of this invention can reduce the quantity of used trichlorofluoromethane regarded as the main cause of environment problems such as the destruction of the ozone layer, etc. and at the same time, it can contribute to the saving of energy owing to its excellent heat insulating performance. In other words, the foamed heat insulation material of this invention can simultaneously achieve both the objects mentioned above and be provided.

In the comparative example in which no hydrophobic zeolite is added, a large quantity of carbon dioxide exists as the foaming gas, due to which thermal conductivity is not good. In another comparative example in which a zeolite is added, water is instantaneously adsorbed, so that carbon dioxide is not generated and the density of the foamed material is high and the quantity of the fluorocarbon gas used required for achieving a foaming to the same volume is expected to be higher. In this case, the reduction in quantity of the fluorocarbon used is not achieved, though thermal conductivity is satisfactory because the gas in foams is purified into a fluorocarbon gas.

Next, another example will be illustrated by way of Table 2.

This example was different from the first example in that the isocyanate component was different. This isocyanate component was constituted of organic polyisocyanate A consisting of crude MDI having an amine equivalent of 135 and a hydrophobic zeolite. The hydrophobic zeolite was a tentative product prepared by adding 2 parts by weight of polysiloxane silicone oil KF-99 (manufactured by Shin-Etsu Kagaku K.K.) to 100 parts by weight of Synthetic Zeolite 5A (powder type, manufactured by Toso K.K.), stirring and homogenizing the mixture with heating at 80° C. for 30 minutes, thereafter adding 2 parts by weight of an active silyl group-containing silane compound KBM-3103C (manufactured by Shin-Etsu Kagaku K.K.), and stirring and homogenizing the resulting mixture with heating at 80° C. for 30 minutes to form a silicone film on the surface of the above zeolite.

Predetermined quantites (parts) of the premix component and isocyanate component thus prepared were blended to obtain a foamed heat insulation material. Table 2 illustrates reactivity, density and thermal conductivity of the foamed heat insulation material, and composition of the foaming gas.

TABLE 2

| | | Example | Comparative Example A | Comparative Example B |
|---|---|---|---|---|
| Formulation of starting materials | Polyether A | 100 | 100 | 100 |
| | Foam stabilizer A | 1.5 | 1.5 | 1.5 |
| | Catalyst A | 2.5 | 2.5 | 2.5 |

TABLE 2-continued

|  |  | Example | Comparative Example A | Comparative Example B |
|---|---|---|---|---|
| (parts by weight) | Water | 1.5 | 1.5 | 1.5 |
|  | Fluorocarbon foaming agent | 30 | 30 | 30 |
|  | Hydrophobic zeolite | 25 | 0 | 0 |
|  | Zeolite | 0 | 0 | 25 |
|  | Organic polyisocyanate | 130 | 130 | 130 |
| Reactivity (second) | Creaming time | 4 | 3 | 5 |
|  | Gelling time | 36 | 35 | 38 |
| Properties of foam | Density (kg/m$^3$) | 28 | 29 | 36 |
|  | Thermal conductivity $\left(\frac{Kcal}{mh\ °C.}\right)$ | 0.0123 | 0.0134 | 0.0124 |
|  | Gas composition (%) CO$_2$ | 1 | 30 | 2 |
|  | R-11 | 98 | 68 | 97 |

Also, as comparative examples, a case in which no hydrophobic zeolite was used and a case in which a conventional zeolite (Synthetic Zeolite 5A, manufactured by Toso K.K.) was added are also shown in Table 2 similarly (Comparative Examples A and B).

As the above, it has been revealed that the foamed heat insulation material of this invention scarcely contains carbon dioxide in its foams and the foams are filled with a fluorocarbon gas, so that it exhibits an excellent heat insulating performance and can reduce the quantity of the fluorocarbon gas used. This indicates that, since the hydrophobic zeolite is inert to the water-adsorbing reaction, it does not disturb the reaction between an organic polyisocyanate and water and the generated carbon dioxide is utilized as a foaming gas and thereafter the carbon dioxide contained in foams is adsorbed by the zeolite. Although the molecular state of the hydrophobic zeolite is unknown, a silicone resin film is formed on the surface of zeolite powder and functions as a barrier layer to adsorbed gas, and further in the area where the silicone resin film is locally broken and OH group is exposed, too, the hydrophilicity of surface layer has disappeared due to chemical bonding between OH group and a silane compound. Thus, the zeolite keeps inert to water at least during the period of time required for the reaction between water and an isocyanate (about 10 seconds) and, at the same time, regarding the adsorption of carbon dioxide, the zeolite exhibits a practically satisfactory performance even though adsorption rate is low. As a result, the carbon dioxide generated by the reaction between water and an isocyanate can effectively be utilized as a foaming gas, and the density of the foamed material can be reduced to a predetermined value even if the quantity of the used fluorocarbon is small. Further, since the carbon dioxide in foams is adsorbed by the hydrophobic zeolite with the lapse of time, the carbon dioxide is finally eliminated and the gas in foams is purified into a fluorocarbon gas. As a result, the thermal conductivity of the gas is improved and the thermal conductivity of the foamed heat insulation material also becomes satisfactory.

As the above, the foamed heat insulation material of this invention can reduce the quantity of used trichlorofluoromethane regarded as a main cause of environmental problems such as the destruction of the ozone layer, etc. and at the same time it can contribute to the saving of energy owing to its excellent heat insulating performance. In other words, the foamed heat insulation material of this invention can achieve both the objects simultaneously and be provided.

In the comparative examples, in the case of Comparative Example A in which no hydrophobic zeolite is added, thermal conductivity is not good due to the existence of a large quantity of carbon dioxide as the foaming gas. In case a zeolite is added, water is instantaneously adsorbed off and hence no carbon dioxide is generated, so that density was high and it was expected that the quantity of a fluorocarbon required for foaming up to the same volume is larger. In this case, the reduction in quantity of the fluorocarbon used is not achieved, though thermal conductivity is satisfactory because the gas in foams is purified into a fluorocarbon gas.

Next, another embodiment will be illustrated by way of Table 3. The isocyanate component was constituted of organic polyisocyanate A consisting of crude MDI having an amine equivalent of 135 and a hydrophobic zeolite. The hydrophobic zeolite was a tentative product prepared by adding 3 parts by weight of Silicone KF-99 (manufactured by Shin-Etsu Kagaku K.K.) to 100 parts by weight of Synthetic Zeolite 5A (powder type, manufactured by Toso K.K.) and stirring and homogenizing the mixture with heating at 100° C. to form a silicone film on the surface of the above zeolite.

Predetermined quantities (parts) of the premix component and isocyanate component thus prepared were blended to obtain a foamed heat insulation material. Table 3 illustrates reactivity, density and thermal conductivity of the foamed heat insulation material, and composition of the foaming gas.

Also, as comparative examples, a case in which no hydrophobic zeolite was added and a case in which a conventional zeolite (Synthetic Zeolite 5A, manufactured by Toso K.K.) was added are shown in Table 3 similarly (Comparative Example A and B)

TABLE 3

|  |  | Example | Comparative Example A | Comparative Example B |
|---|---|---|---|---|
| Formulation of starting materials (parts by weight) | Polyether A | 100 | 100 | 100 |
|  | Foam stabilizer A | 1.5 | 1.5 | 1.5 |
|  | Catalyst A | 2.5 | 2.5 | 2.5 |
|  | Water | 1.5 | 1.5 | 1.5 |
|  | Fluorocarbon foaming agent | 30 | 30 | 30 |
|  | Hydrophobic zeolite | 25 | 0 | 0 |
|  | Zeolite | 0 | 0 | 25 |
|  | Organic polyisocyanate | 130 | 130 | 130 |
| Reactivity (second) | Creaming time | 3 | 3 | 5 |
|  | Gelling time | 36 | 35 | 38 |
| Properties of foam | Density (kg/m$^3$) | 28 | 29 | 36 |
|  | Thermal conductivity $\left(\frac{Kcal}{mh\ °C.}\right)$ | 0.0125 | 0.0134 | 0.0124 |
|  | Gas composition (%) CO$_2$ | 3 | 30 | 2 |
|  | R-11 | 96 | 68 | 97 |

As the above, it has been revealed that the foamed heat insulation material of this invention scarcely contains carbon dioxide in its foams and the foams are filled with a fluorocarbon gas, so that it exhibits an excellent heat insulating performance and can reduce the quantity of the fluorocarbon gas used. This indicates that, since the hydrophobic zeolite is inert to the water-absorbing reaction, it does not disturb the reaction between an organic polyisocyanate and water and the generated carbon dioxide is utilized as a foaming gas and thereafter the carbon dioxide contained in foams is adsorbed by the zeolite. Although the molecular state of the hydrophobic zeolite is unknown, a silicone resin film is formed on the surface of zeolite powder and functions as a barrier layer to adsorbed gas, as the result of which the zeolite keeps inert at least during the period of time required for the reaction between water and an isocyanate (about 10 seconds) and, regarding the adsorption of carbon dioxide, the zeolite exhibits a practically satisfactory performance even though adsorption rate is low. Thus, the carbon dioxide generated by the reaction between water and an isocyanate can effectively be utilized as a foaming gas and the density of the material can be reduced to a predetermined value even if the quantity of used fluorocarbon is small. Further, since the carbon dioxide in foams is adsorbed by the hydrophobic zeolite with the lapse of time, the carbon dioxide is finally eliminated and the gas in foams is purified into a flurocarbon gas. As a result, the thermal conductivity of the gas is improved, and the thermal conductivity of the foamed heat insulation material also becomes satisfactory.

As the above, the foamed heat insulation material of this invention can reduce the quantity of trichlorfluoromethane used which is regarded as a main cause of the environment problems such as the destruction of the ozone layer, etc. and, at the same time, it can contribute to the saving of energy owing to its excellent heat insulating performance. In other words, the foamed heat insulation material of this invention can simultaneously achieve both the objects mentioned above and be provided.

In comparative examples, in ase no hydrophobic zeolite is added, a large quantity of carbon dioxide is present as the foaming gas, due to which the thermal conductivity is not good. In case zeolite is added, water is instantaneously adsorbed off, so that carbon dioxide is not generated and density is high and the quantity of the used flurocarbon required for achieving a foaming up to the same volume is expected to be higher. In this case, the reduction in quantity of the flurocarbon used is not achieved, though thermal conductivity is satisfactory because the gas in foams is purified into a fluorocarbon gas.

Next, the fourth example will be illustrated with reference to Table 4.

Polyether A was an aromatic amine type polyether having a hydroxyl number of 460 mg KOH/g; foam stabilizer A was F-335 manufactured by Shin-Etsu Kagaku K.K.; catalyst A was Kaolizer No. 1 manufactured by Kao K.K.; and foaming agent was constituted of pure water and Flon CFC-11. Further, as a metal hydroxide of which surface has been treated with silicone, a tentative product prepared by adding 3 parts by weight of silicone KF-99 (manufactured by Shin-Etsu Kagaku K.K.) to 100 parts by weight of a powdery calcium hydroxide and stirring and homogenizing the mixture with heating at 100° C. to form a silicone film on the surface of the calcium hdyroxide was used. Predetermined quantities (parts) of the starting materials were blended to prepare a premix component.

On the other hand, isocyanate component is organic polyisocyanate A consisting of crude MDI having an amine equivalent of 135.

Predetermined quantities (parts) of the premix component and isocyanate component thus prepared were blended together to obtain a foamed heat insulation material. Table 4 illustrates reactivity, density, thermal conductivity and composition of the gas.

Also, as comparative examples, a case in which calcium hydroxide surface-treated with silicon was not added and a case in which calcium hydroxide not surface-treated with silicone was added are similarly shown in Table 4.

TABLE 4

|  |  | Example | Comparative Example | |
|---|---|---|---|---|
|  |  |  | A | B |
| Formulation of starting materials (parts by weight) | Polyether A | 100 | 100 | 100 |
|  | Foam stabilizer A | 1.5 | 1.5 | 1.5 |
|  | Catalyst A | 2.5 | 2.5 | 2.5 |
|  | Water | 1.5 | 1.5 | 1.5 |
|  | Fluorocarbon foaming agent | 30 | 30 | 30 |
|  | Calcium hydroxide surface-treated with silicone | 25 | 0 | 0 |
|  | Calcium hydroxide | 0 | 0 | 25 |
|  | Organic polyisocyanate | 130 | 130 | 130 |
| Reactivity (second) | Creaming time | 3 | 3 | 1 |
|  | Gelling time | 36 | 35 | 15 |
| Properties of foam | Density (kg/m$^3$) | 30 | 29 | 30 |
|  | Thermal conductivity $\left(\frac{Kcal}{mh\ °C.}\right)$ | 0.0125 | 0.0134 | 0.0145 (Irregular cells) |
|  | Gas composition (%) $CO_2$ | 3 | 30 | 15 |
|  | R-11 | 96 | 68 | 85 |

As the above, it has been revealed that the heat insulation material of this invention scarcely contains carbon dioxide in its foams and the foams are filled with a fluorocarbon gas, so that it exhibits an excellent heat insulating performance and can reduce the quantity of the fluorocarbon gas used. This indicates that, since the calcium hydroxide surface-treated with silicone causes no water-absorbing reaction, it does not disturb the reaction between an organic polyisocyanate and water and the generated carbon dioxide is utilized as a foaming gas and thereafter the carbon dioxide contained in foams is adsorbed off by the calcium hydroxide. Owing to the silicone resin film formed on the surface of the calcium hydroxide powder, the calcium hydroxide loses its catalytic action upon urethane reaction, so that it does not react with carbon dioxide at least in the process wherein water reacts with an isocyanate and foaming occurs (about 10 seconds), and the calcium hydroxide slowly reacts with the carbon dioxide and adsorbs it after formation of foams.

The calcium hydroxide was a practically satisfactory performance, though its adsorbtion rate is low.

Thus, the carbon dioxide generated by the reaction between water and an isocyanate can be effectively utilized as a foaming gas, and the density of the foamed material can be reduced to a predetermined value even if fluorocarbon is used only in a small amount. Further, since the carbon dioxide present in foams is adsorbed by the calcium hydroxide, the carbon dioxide is ultimately eliminated and the gas in foams is purified into a flurocarbon gas. As a result, the thermal conductivity of the gas is improved and the thermal conductivity of the foamed heat insulation material also reaches a satisfactory value.

As the above, the foamed heat insulation material of this invention can reduce the quantity of used trichlorofluoromethane regarded as a main cause of environmental problems such as the destruction of the ozone layer, etc. and, at the same time, it can contribute to the saving of energy owing to its excellent heat insulating performance. In other words, the foamed heat insulation material of this invention can simultaneously achieve both the objects mentioned above and be provided.

In the comparative examples, in case calcium hydroxide surface-treated with silicone is not added, a large quantity of carbon dioxide exists as gas in foams, due to which thermal conductivity is not good. Calcium hydroxide not surface-treated with silicone is disadvantageous in that it has a catalytic effect on urethane reaction so that the urethane reaction was much accelerated, and accordingly, it is impractical because of irregularity of cells, etc.

INDUSTRIAL UTILIZABILITY

It is apparent from the descriptions give above that, according to this invention, the carbon dioxide gas generated by the reaction between water and an organic polyisocyanate is effectively utilized as a foaming gas owing to the use of a carbon dioxide adsorbent of which surface has been made hydrophobic, and thereby the quantity of the fluorocarbon foaming agent used can be decreased. At the same time, the carbon dioxide generated and remaining in foams can be adsorbed off with the adsorbent with the lapse of time. As a result, the thermal conductivity of the gas in foams is lowered, and the thermal conductivity of the foamed heat insulation material is improved, and a foamed heat insulation material having an excellent heat insulating performance can be provided. Thus, the heat insulation material of this invention is easily usable as a foamed heat insulation material for refrigenerators, freezers and the like.

We claim:

1. A foamed heat insulation material produced by mixing a predetermined quantity (parts) of an isocyanate component to which is added an adsorbent consisting of a zeolite of which surface has been treated so as to make it hydrophobic by forming a polymerized film of polysiloxane and reacting it with a silane compound having active silyl group with a predetermined quantity (parts) of a premix component prepared by mixing together predetermined quantities (parts) of a polyether, a foam stabilizer, a catalyst, water and a fluorocarbon foaming agent, stirring the resulting mixture and foaming it.

2. A foamed heat insulation material according to claim 1 wherein said zeolite is a hydrophobic zeolite produced by treating the surface of a zeolite with a silane compound having reactive silyl group.

3. A foamed heat insulation material produced by mixing premix component consisting of a polyether, a foam stabilizer, a catalyst, water, a fluorocarbon foaming agent and a metal hydroxide of which surface has been treated with silicone with an isocyanate component consisting of an organic polyisocyanate, stirring the resulting mixture and foaming it.

* * * * *